(12) United States Patent
Kaply et al.

(10) Patent No.: US 7,458,145 B2
(45) Date of Patent: Dec. 2, 2008

(54) METHODS AND ARRANGEMENTS FOR HARDWARE CASING MEDIA TO STORE DATA

(75) Inventors: Michael Aaron Kaply, Leander, TX (US); Walter Chun-Won Lee, Cedar Park, TX (US); Jonas Sicking, Austin, TX (US); Lloyd Bernard Stearns, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 10/755,838

(22) Filed: Jan. 12, 2004

(65) Prior Publication Data

US 2005/0152104 A1    Jul. 14, 2005

(51) Int. Cl.
*H05K 3/36* (2006.01)
*H05K 3/30* (2006.01)

(52) U.S. Cl. .......................... 29/830; 29/832

(58) Field of Classification Search ................. 361/686, 361/683; 710/303, 304; 720/601; 29/830, 29/832, 854, 825
See application file for complete search history.

(56) References Cited

U.S. PATENT DOCUMENTS

| | | | |
|---|---|---|---|
| 5,363,273 A * | 11/1994 | Ma | ........................... 361/686 |
| 6,149,001 A | 11/2000 | Akins | |
| 6,208,506 B1 | 3/2001 | Pao | |
| 6,222,726 B1 * | 4/2001 | Cha | ........................... 361/683 |
| 6,392,876 B1 | 5/2002 | Ramonowski | |
| 6,442,637 B1 * | 8/2002 | Hawkins et al. | ............. 710/300 |
| 6,621,691 B2 | 9/2003 | Howell | |
| 6,717,801 B1 * | 4/2004 | Castell et al. | ............... 361/683 |
| 6,788,529 B2 * | 9/2004 | Homer et al. | ............... 361/683 |
| 6,791,827 B2 * | 9/2004 | Kuo | ........................... 361/683 |
| 6,842,335 B1 * | 1/2005 | Hanson et al. | ............... 361/683 |

FOREIGN PATENT DOCUMENTS

EP    1 276 114 A2    1/2003

* cited by examiner

*Primary Examiner*—Lisa Lea-Edmonds
(74) *Attorney, Agent, or Firm*—Matthew W. Baca; Schubert Osterrieder & Nickelson PLLC (57) ABSTRACT

Embodiments include hardware and/or software for manufacturing a removable plate having a medium, to be integral to a casing for a processor-based device. Integrating the removable plate in or on the casing facilitates access to the medium and the data stored on the medium by providing storage in a location that is convenient and local to the processor-based device. The removable plate may include a first surface designed to cover a portion of the processor-based device and a second surface to provide access to the medium. The removable plate may also include any other types of media that can communicatively couple with the processor-based device directly, or indirectly through, e.g., a computer network.

2 Claims, 8 Drawing Sheets

METHODS AND ARRANGEMENTS FOR HARDWARE CASING MEDIA TO STORE DATA

FIELD OF INVENTION

The present invention is in the field of computer hardware architecture. More particularly, the present invention relates to methods and arrangements to utilize a part of a hardware casing to store data.

BACKGROUND

Computers have progressively benefited from increasing external storage. When more external storage is available, computers can perform broadened functions while utilizing programs and data. In fact, any processor-based device can perform broadened functions by increasing external storage. Processor-based devices include computer equipment that contains a processor capable of processing instructions to some extent, for example, a printer, router, personal digital assistant (PDA), and the like.

An example of a processor-based device is a general-purpose machine, such as a personal computer that processes data according to a set of instructions that are stored internally either temporarily or permanently. Some sets of instructions direct a processor-based device to input, process, and output data. The sets of instructions available to a processor-based device may be larger if some instruction sets are externally stored to supplement the internal memory. Thus, external storage increases sets of instructions available to increase functionality of a processor-based device. One example of an increase in functionality is more stability of data where the external storage is a replication of the internal memory.

Next, a processor-based device may selectively retrieve data into its main memory from any peripheral storage device, such as a terminal, disk, or tape. The more external storage, the more data available to retrieve. In many cases, a processor-based device may include more external storage than internal memory. Thus, the external storage provides more storage to the processor-based device than it would have had the capacity to store without external storage.

External storage may also allow internal memory to not be burdened by data that may be stored externally and, thus, may free up internal memory for a set of tasks of a processor-based device. The more internal memory a processor-based device has available, the faster it can process. Further, the more external storage a processor-based device has available, the more programs and data with which it can work at the same time.

Typical examples of external storage include magnetic disks or tapes to store data for later retrieval, either as a semi-permanent or permanent holding place. Magnetic disks, such as hard disk drives or floppy disks, hold magnetically recorded data. These disks may be re-recorded over and over. Magnetic tape drives use magnetic tape as a sequential storage medium. This type of storage is typically used for data collection, backup and historical purposes. Magnetic tape is made of flexible plastic with one side coated with a ferromagnetic material. Tapes come in reels and cartridges of many sizes and shapes. Although still used in legacy systems, open reels have been mostly superseded by cartridges with enhanced storage capacities.

Additional examples of external storage include optical disk drives. Optical disk drives use a direct access disk, which is written and read by light. A digital versatile disk (DVD) and a CD are examples of optical disks used in optical disk drives. Many types of optical disks are available. CD, CD-ROM, DVD-ROM and DVD-Video are examples of read-only optical disks that are recorded at the time of manufacture and cannot be erased. CD-R, DVD-R, WORM, and magneto-optic (in WORM mode) disks are examples of write-once optical media. CD-RW, DVD-RW, CD+RW, DVD+RW are examples of magneto-optic disks that allow for repeated recording. Further, ultra density optical (UDO) storage devices provide for larger capabilities of storage on an optical disk.

As beneficial as external storage is to a processor-based device, the problem of keeping external storage handy to its relevant processor-based device makes these benefits difficult to be realized. A special case that exacerbates problem with current external storage systems is the particular inconvenience of carrying media with portable processor-based devices. Processor-based devices have become lighter, smaller, easier to use and more portable. An aspect that remains inconvenient is that corresponding data, backup files, installation software, or recovery disks are not handy to a computer operator. For example, a laptop user who is a Boston resident may be working in an airport in Seattle. If the laptop system crashes in Seattle, it would be extremely convenient for a boot CD or other relevant external storage to be with the laptop user.

To keep software associated with respective equipment, various solutions have been employed. One solution which has been used is laptop computer covers with pockets. These pockets, however, wear out and may be replaced. Further, these covers are an accessory to be purchased in addition to the computerized machine. Moreover, these covers are not as generally available for other pieces of hardware such as routers, printers, and the like, besides a laptop computer.

Another solution to store media within access of a processing-based device is an automated media storage library, for example, the IBM 3584 Media Storage Library. However, automated media storage libraries are cumbersome, do not clearly associate which device relates with which external storage, and are not portable for the case of portable processor-based devices.

Accordingly, there is a need to keep external storage handy to its relevant processor-based device.

SUMMARY OF THE INVENTION

The problems identified above are in large part addressed by methods, systems, and media to store data as part of a piece of hardware casing. One embodiment provides a removable plate having a medium, to be integral to a casing for a processor-based device to facilitate access to the medium. The removable plate contemplates a first surface designed to cover a portion of the processor-based device; and a second surface to be covered by the first surface when integrated with the casing, the second surface being designed to provide access to the medium, wherein the medium is to store data associated with an operation of the processor-based device.

Another embodiment provides a method to couple a medium to a casing for a processor-based device. The method generally includes manufacturing a first surface of a removable plate to cover a portion of the processor-based device; and, adapting a second surface of the removable plate to provide access to the medium, the medium being capable of storing data associated with an operation of the processor-based device.

An additional embodiment provides a method to couple a medium to a casing for processor-based device. The method generally includes determining a first surface of a removable plate wherein the first surface is complementary to the casing and is manufactured to cover a portion of the processor-based device, wherein a second surface of the removable plate is configured to provide access to the medium, the medium being capable of storing date, wherein the second surface is designed to face the processor-based device on the inner side of the casing; adapting the removable plate to couple with the casing; and determining a first surface of a removable plate comprises painting a coating onto an existing medium.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media to store data as part of a hardware casing are contemplated. One embodiment provides a removable plate having a medium, to be integral to a casing for a processor-based device. Integrating the removable plate in or on the casing facilitates access to the medium and the data stored on the medium by providing storage in a location that is convenient and local to the processor-based device. Integrating the removable plate in the casing also encourages the user to replace the removable plate into or on the casing after the user uses the medium since, in many embodiments, the casing is obviously incomplete without the removable plate being in the designated storage location. For example, the removable plate may function as a cover plate for a battery compartment, serving as a retainer wall or a backup retainer wall to keep the batteries from falling out of the processor-based device. When the user wants to access data on the medium, the removable plate is removed, exposing the batteries and possibly a warning sign stating that "the removable plate should be replaced before using this device." In further embodiments, the removable plate may be part of a design integral to the casing.

The removable plate may include a first surface designed to cover a portion of the processor-based device and a second surface to be covered by the first surface when integrated with the casing, to provide access to the medium. For example, the removable plate may include a compact disk (CD). The upper surface of the CD may be covered with a coating to protect the CD from damage and/or match a color or design of the exterior of the casing. The other side of the CD may remain clear to provide access to the data on the CD. In some embodiments, a surface protector may couple with the CD via the opening in the center of the CD to disguise the hole and to protect the latter side of the CD. In further embodiments, a member to disguise the opening at the center of the CD may snap into the CD and serve the function of just disguising the opening.

The removable plate may also include any other types of media. For instance, the removable plate may include a read-write type of media such as a CD-RW, a DVD-RW, a CD-R, a DVD-R, a flash memory device, a floppy disk, or any other type of media that can communicatively couple with the processor-based device directly, or indirectly through, e.g., a computer network.

Figure 1:
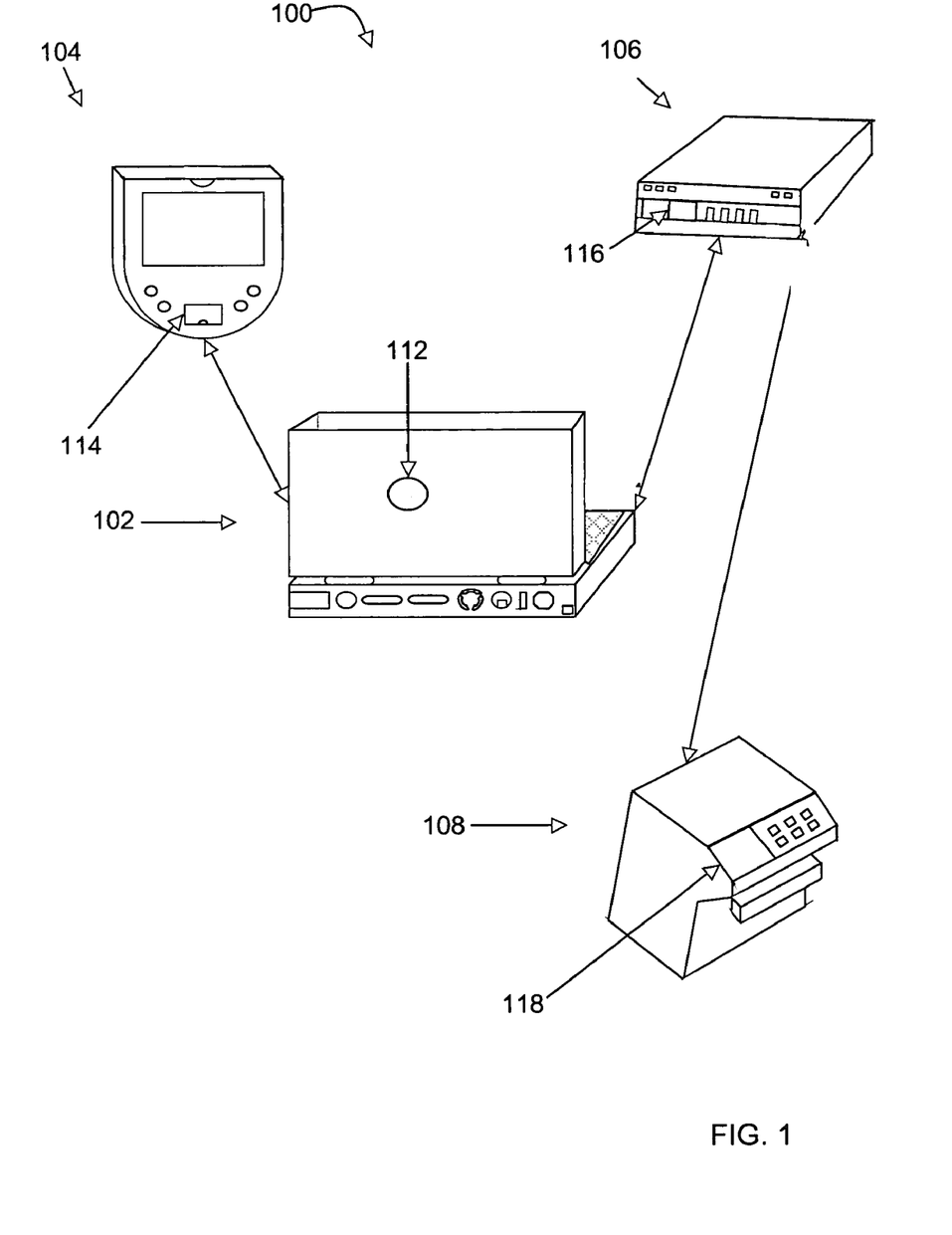
FIG. 1 depicts an embodiment of a system including a computer, PDA, router, and printer to store data as part of a hardware casing.

Turning now to the drawings, FIG. 1 depicts an embodiment of a system of processor-based devices able to store data as part of a hardware casing. An embodiment of a processor-based device typically provides a piece of computer hardware, for example, a computer (102), PDA (104), router (106), and printer (108). These processor-based devices include a casing, a piece of one or all may be a removable plate, for example removable plates (112, 114, 116, 118), with a medium to provide access to data or to the medium to backup data. The medium on the removable plates (112, 114, 116, 118) may function as data storage, software installation, or as a recovery medium to store sufficient information to either reboot the system in case of a software failure or restore essential data for an operating system to recover from the software failure.

For example, a user may connect the PDA (104) to the computer (102) to exchange calendar events, contact lists, or to download email messages. These tasks may require specific software to be installed properly. If an error occurs that data or software may solve, the PDA (104) may have a removable plate (114) of media handy and ready to install the necessary data or software on either the PDA (104) or the computer (102).

As another example, a user may connect the router (106) to the computer (102) to facilitate network exchange between two networks. If an error occurs that data or software may solve, for example a transmission protocol malfunction, the router (106) may have a removable plate (116) of media handy and ready to install the necessary data or software onto the router (106) or the computer (102).

In another example, a user may connect the printer (108) to the router (106) connected to the computer (102). Though the printer (108) is not directly connected to the computer (102), it includes a removable plate (118) of data or software integrated into the printer (108). The user may install software from the removable plate (118) to allow the printer (108) to support further graphics. In this embodiment, the data or software on the media on the removable plate (118) is handy to the printer (108) because the data or software is relevant to that printer (108). In another embodiment, the computer (102) may include data or software in its removable plate (112) that is relevant to other machines, as well, such as the printer (108), PDA (104), or router (106).

System (100) illustrates that in many embodiments, a processor-based device may include removable plates that include media that the processor-based device is unable to process itself. In these embodiments, these processor-based devices are able to connect to processor-based devices that are able to process data from the medium. Media-processing processor-based devices may include workstations, servers, portable computers, PDAs, and the like. For example, in one embodiment, the router (106), the printer (108), and the PDA (104) that typically do not include a CD-ROM are able to connect to the computer (102) that typically does include a CD-ROM to request, process, or store CD data. Thus, in some embodiments, a processor-based device may include a removable plate with a medium that that processor-based device itself is not able to process. In these embodiments, for example, if printer (108) does not include a CD drive, a user may place a removable plate from the printer (108) into a CD drive of the computer (102). As well, if router (106) does not include a flash memory slot, a user may plug a removable plate from the router (106) into a flash memory slot of the PDA (104).

Figure 2A:
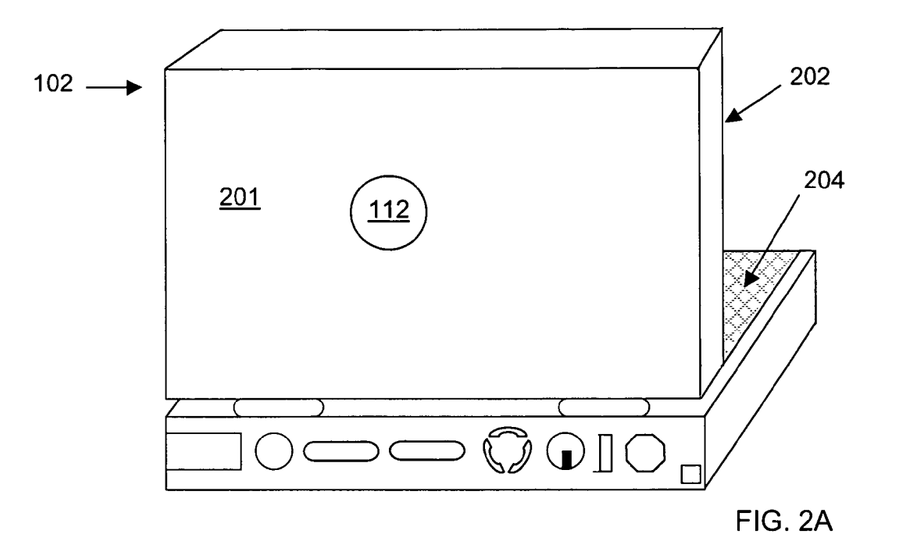
FIGS. 2A-2B depict embodiments of a processor-based device, a portable computer, including a casing and a removable plate to store data as part of a hardware casing.

Referring now to FIG. 2A, FIG. 2A depicts an embodiment of a computer (102), as a processor-based device to store data as part of a hardware casing. The computer (102), such as an IBM ThinkCentre A30, IBM NetVista M42, or Apple Power Mac G5, or a portable computer such as an IBM ThinkPad G40, Dell Inspiron 1100, or Sony VAIO® Notebook Computer, is a device to accept information in the form of digitalized data and process it based on a sequence of instructions.

***As a device, the computer (102) includes a hardware casing (201), a display screen (202), and a keyboard (204). In one embodiment, the casing (201) substantially encases the display screen (202), keyboard (204). The casing (201) may be made of plastic, metal, metal alloy, or the like, with openings shaped into the casing. The casing (201) comprises twelve openings in FIG. 2A, but persons of ordinary skill in the art will realize that the casing (201) may comprise as few as one opening or as many openings as are limited by the surface area of the computer (102) versus the surface area of the number of openings chosen. The openings may also be of varying sizes on the same computer (102). In one embodiment, the openings may be created to cover portions of the casing (201) manufactured to be absent.

Typically, openings in the casing (201) allow access to equipment connections. For example, computer (102) generally includes openings for such connections as a VGA output, serial port, parallel port, USB connection, mouse input, power connection, audio connections, modem/Ethernet connections and other equipment leads.

In another embodiment, the openings may be constructed by cutting shapes from the casing or manufacturing the casing with openings particularly for, e.g., removable plate (112). For example, in FIG. 2A, a circular opening has been cut out of the casing behind the display screen (202). To protect and cover openings in the casing of computer (102), computer (102) includes one or more removable plates, for example removable plate (112), which covers the opening in the casing behind the display screen (202). Removable plate (112) also includes a medium and a surface designed to provide access to that medium. The medium may be read by placing the removable plate into a drive or slot on the computer (102) that would typically read the medium. More specifically, the removable plate (112) may include a CD or DVD with recovery software for computer (102) and, in some embodiments, computer (102) may include a CD-RW drive and removable plate may be a CD-RW, allowing the recovery software to be updated periodically.

Figure 2B:
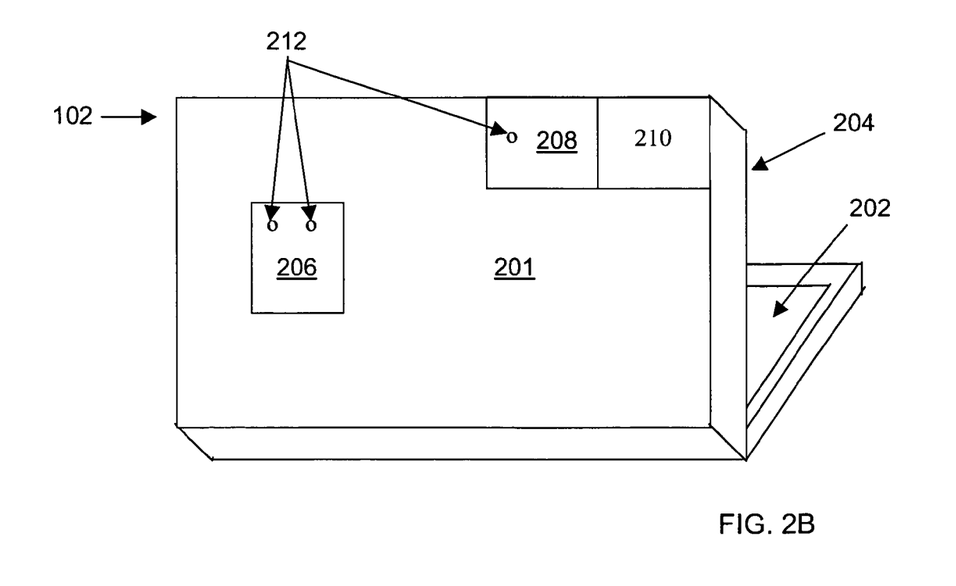

Referring now to FIG 2B, FIG 2B illustrates another view of computer (102) to store data as part of a piece of hardware casing. FIG 2B depicts the bottom of keyboard (204). In an embodiment, a removable plate of the casing (201) of computer (102) may also be located beneath keyboard (204). In this embodiment, removable plates (206, 208, and 210) are panels covering portions of the bottom of computer (102). Removable plate (206) covers an opening in casing (201) for a network card, removable plate (208) covers an opening for a battery case, and (210) covers an opening for memory. FIG 2B also shows three locking structures (212) to couple the removable plates (206, 208, and 210) to the casing (201). In some embodiments, these locking structures (212) may be screws, tabs, or any other mechanical structure to lock the removable plates (206, 208, and 210) to the casing (201). Locking structures (212) may not be present in other embodiments that attach removable plates with adhesive, for example.

Figure 3A:
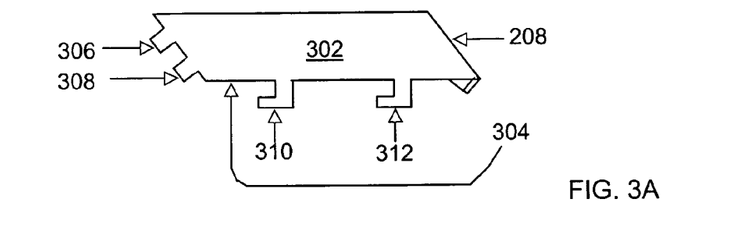
FIGS. 3A-B depict embodiments of a removable plate including tabs and multiple surfaces to protect and store data as part of a hardware casing.

Referring now to FIG. 3A, the removable plate (208) of the computer (102) is discussed in more detail. FIG. 3A depicts an embodiment of the removable plate (208) to protect and store data as part of a piece of hardware casing. In one embodiment, the removable plate (208) includes at least two surfaces, surface (302) and surface (304). Surface (302) is designed to cover an opening on a portion of a processor-based device while surface (304) serves to provide access to a medium integrated into the removable plate (208). In this embodiment, surface (304) fits into the computer (102) with its face, for example, an optical face for a CD, directed toward the inside of the computer (102). In this embodiment, the medium is able to store data associated with an operation of the computer (102) or a processor-based device coupled to it. The mediums that may be incorporated into the removable plate (208) may be a CD, a readable/writeable CD, a digital video disk, a flash memory device, a memory stick, an optical disk, a magnetic medium, and the like. Data that may be stored on the medium may include system boot data, recovery software, additional data storage, printer fonts, updates, software installation information, and the like.

Figure 3B:
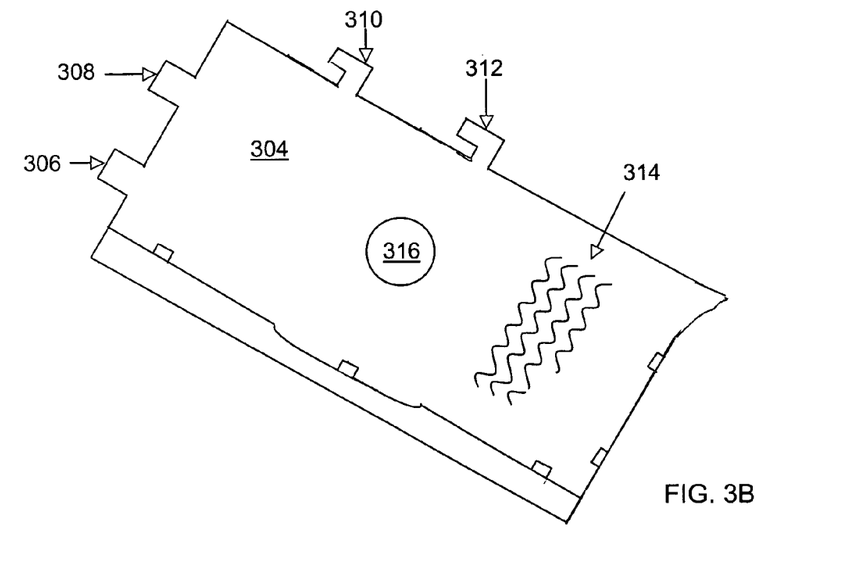

As an additional aid to FIG. 3A, FIG. 3B illustrates the underside of removable plate (208) to store data as part of the hardware casing of computer (102). Removable plate (208) includes tabs (306, 308, 310, and 312) as locking structures for removable plate (208) to be more secure in a casing of the computer (102). In some embodiments, tabs (306, 308, 310, and 312) may also be used to eject the removable plate from a casing. In one embodiment, tabs (306, 308, 310, and 312) may be manually operated to release the removable plate from the casing. In another embodiment, some tabs may be locking structures while other tabs function as ejection structures. For example, tab (312) may be used to eject removable plate (208) in some embodiments while tabs (306, 308, and 310) may be locking structures instead.

It is important to note that removable plate (208) may include symmetric irregularities, such as tabs or holes in its design and still function as an embodiment of the present invention. The removable plate (208) may be shaped oval, triangular, rectangular, trapezoidal, or in any other way.

Regardless of irregularities, access to the media stored on the removable plate (208) may still be achieved with, for example, simple connections to an inner flash memory or other media. Even in the case of a CD, the removable plate (208) may have irregularities in symmetry. One embodiment employs a CD as a medium on the surface (304) of the removable plate (208) and calculates an aperture to be located in the center of gravity of removable plate (208); thus, the CD may be read with balance though the removable plate (208) is asymmetric. In the depicted embodiment, an aperture may be made for a CD to have an essentially central aperture with which to spin by removing area (316) which is a smaller piece of the removable plate (208). Additionally, it is also possible to have written instructions (314) regarding the media on the underside of the removable plate (208). For example, on the underside of a removable plate, instructions may be written to explain how to clear an aperture for a CD.

In many other embodiments, the removable plate (208) includes different characteristics that are still consistent with the present invention. For example, the removable plate (208) may include any number of surfaces; Even as this embodiment depicts surface (302) and surface (304) to be opposite each other, a connector for a medium may be on an end of the removable plate and still protected or covered by surface (302) when attached to the casing; thus, it is not necessary that surface (304) always be the medium's surface. Additionally, it is important to note that surface (304) does not necessarily constitute the chosen medium's actual surface. In one embodiment, the medium is flash memory, and surface (304) merely provides access to it. In another embodiment, the medium is a CD, and surface (304) may be plastic that is transparent to provide access to the medium. In this embodiment, the medium may be ink near the foil in the CD.

Figure 4A:
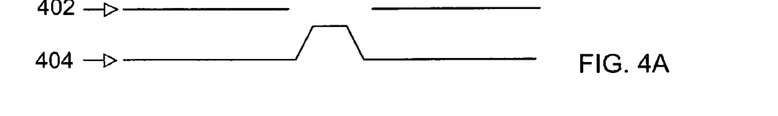
FIGS. 4A-B depict embodiments of a double-sheeted construction to both be able to cover an opening in a casing and to uncover an aperture for a medium.
Figure 4B:
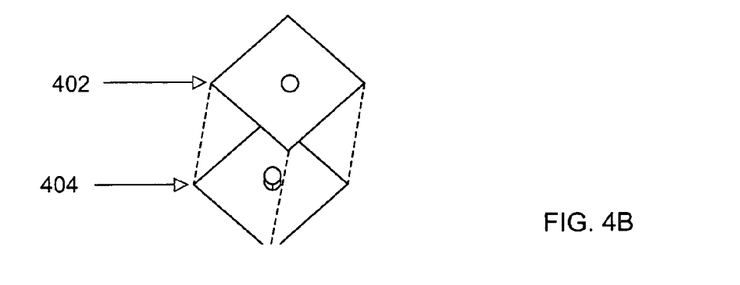

To access data from a CD medium on removable plate (208), area (316) may be removed to clear an aperture. Turning now to FIG 4A and FIG 4B, an embodiment of a structure to provide access to an aperture essentially central to a CD is explained with reference to FIGS 4A and 4B. FIG 4A depicts an embodiment of a double-sheeted construction to both be able to cover an opening in a casing and to uncover an aperture for medium data that uses an aperture during operation to provide access to data as part of a piece of hardware casing. FIG 4B depicts an additional view of an embodiment of a double-sheeted construction to both cover the opening and also uncover an aperture for data stored on a CD in a removable plate of a casing of a processor-based device. In some embodiments, the construction of 4A may include sheet (402) which may be a CD with an aperture in it, for example. Sheet (404) snaps to sheet (402) and uses area (316) to protect the aperture portion of the opening in a casing while a CD is not in use. In several embodiments, sheet (404) serves as the removable plate (208) of FIG 4B and may be sized to be the same dimensions as sheet (402). Sheet (404) may also be larger than sheet (402). In other embodiments, sheet (402) serves as the removable plate (208) of FIG 4B, and sheet (404) may also be as small as a plug to sheet (402). In these embodiments, it may be helpful to position the surface of sheet (402) that exposes the larger circumference of sheet (404) as a plug to the inside so that sheet (404) is not lost. Depending on the dimensions of sheet (402) and sheet (404) and the structure of their coupling, this positioning is not always necessary.

Figure 5A:
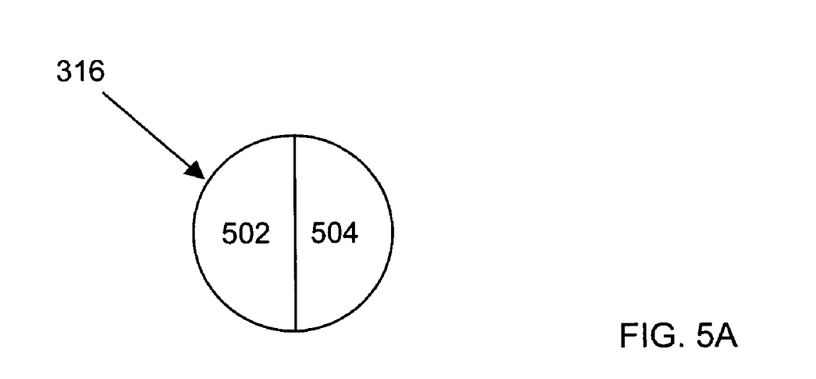
FIGS. 5A-B depict embodiments of a closed area able to uncover an aperture of a medium to store data as part of a hardware casing.
Figure 5B:
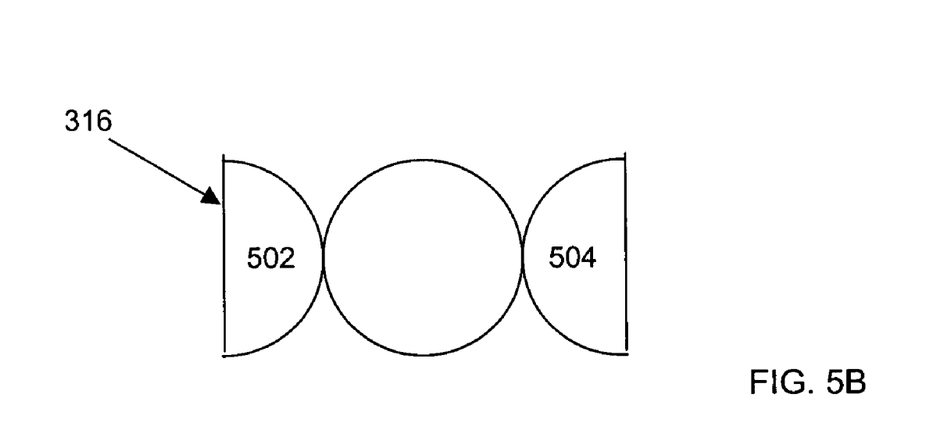

Another way to remove area (316) of FIG. 3B in the circumstance of a medium that may use an aperture is explained with reference to FIGS. 5A and 5B. FIG. 5A depicts an embodiment of an area (316) to uncover an aperture of a medium to store data as part of a piece of hardware casing. FIG. 5B depicts an embodiment of an opened area (316) able to uncover an aperture of a medium to store data as part of a hardware casing. In FIG. 5A, area (316) is divided into two subdivisions (502, 504). FIG. 5B depicts subdivisions (502, 504) of area (316) folded opened to uncover an aperture with which a CD, DVD, or other piece of media may spin. Subdivisions (502) and (504) are not necessarily the same size for the present invention because they may be weighted differently to balance an overall CD, DVD, or other medium that may use an aperture. In one embodiment, subdivisions (502) and (504) open in separate directions like Double doors. As a practical matter, subdivisions (502) and (504) may open in separate directions that are not necessarily opposite directions in other embodiments.

Figure 6:
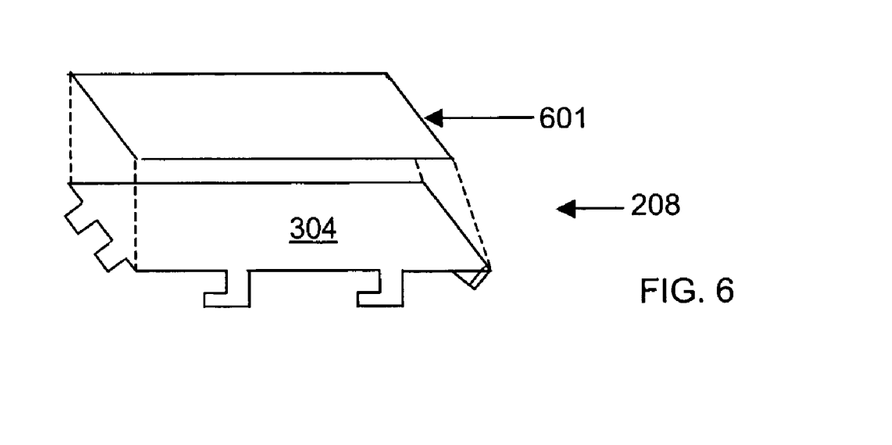
FIG. 6 depicts an embodiment of a media protection system including a removable plate coupled with an insert to dissipate heat.

Media on removable plates may be protected with various measures in conjunction with this invention. FIG. 6 depicts an embodiment of a media protection system including a removable plate (208) coupled with an insert to dissipate heat (601) to aid to store data as part of a piece of hardware casing. In some embodiments, a metalized insert (601) may help protect a removable plate (208) if it is located near heat, especially if electromagnetic radiation is producing heat. Another way to protect media on a removable plate is to choose carefully the location on the casing that the removable plate will appear. Location on a casing may be, as a practical manner, limited by the type of media used. If magnetic media is used, one embodiment may avoid placing that media in a removable plate near a power supply but may allow placement near RAM. As well, another embodiment places removable plates on essentially flat surfaces. One more embodiment indents removable plates slightly to ensure the removable plate is not a primary load-bearing surface. Avoiding any impact surfaces is also typical of this embodiment to protect a medium on a removable plate. Also, a further embodiment may insulate screws with rubber or other shock-absorbing material to avoid cracking brittle media, such as a CD.

Figure 7:
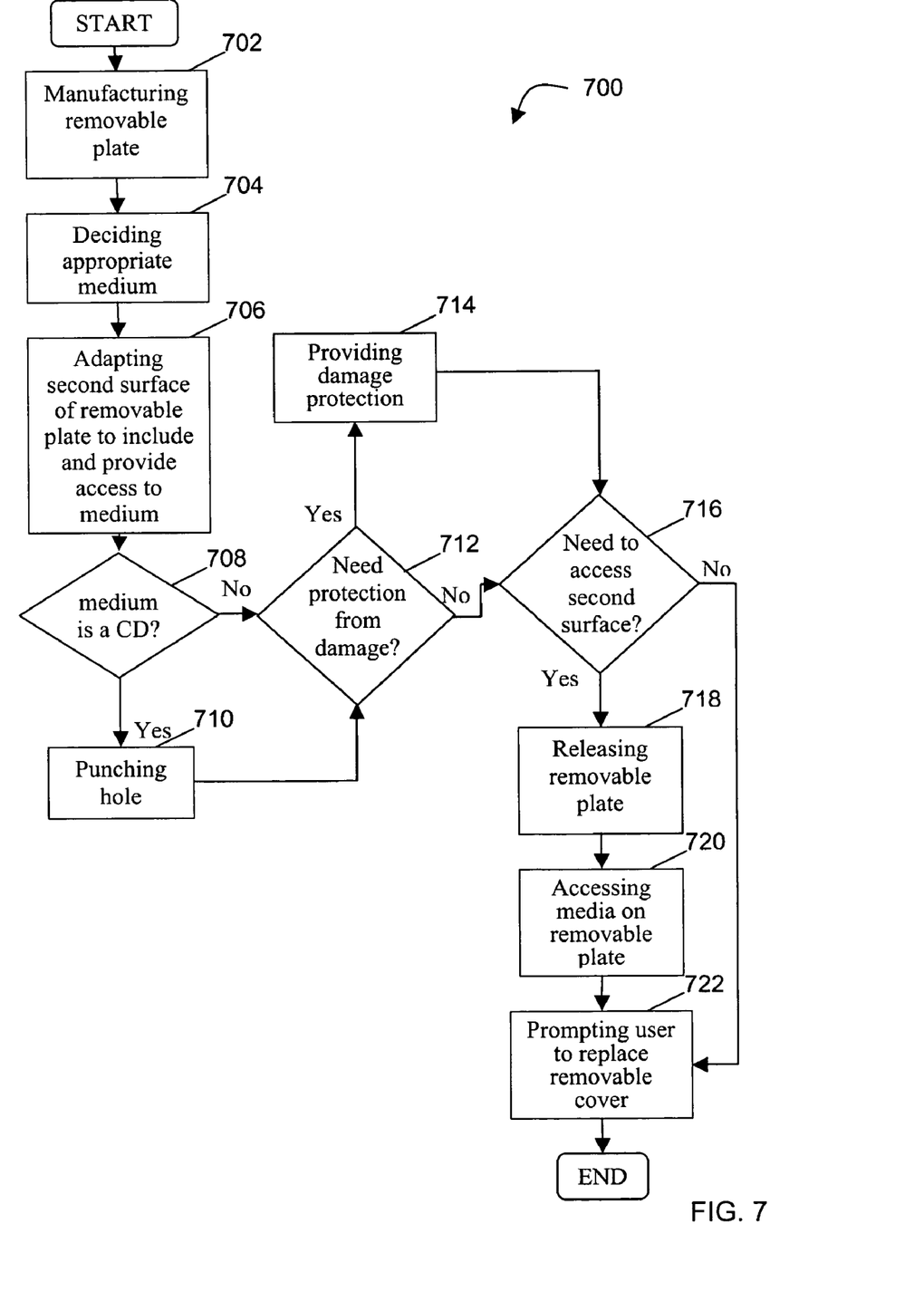
FIG. 7 depicts an example of a flowchart for a method to couple a medium to a casing for a processor-based device.

Referring now to FIG. 7, there is shown an example of a flow chart for a method to couple a medium to a casing for a processor-based device. Flow chart 700 begins with element 702, manufacturing a first surface of a removable plate, such as the removable plate (208) from FIG. 2B, to cover a portion of a processor-based device. In an embodiment of the present invention, a removable plate may be added anywhere on a casing of a processor-based device by removing the outline of the removable plate from the casing and fitting the removable plate into the casing. The first surface of the removable plate is machined to protect openings in a casing of the processor-based device.

After the first surface is manufactured, an appropriate medium is selected (element 704). In one embodiment, the medium is any medium capable of storing data associated with an operation of a processor-based device. Then, in element 706, a second surface of the removable plate is adapted to provide access to the selected medium. A medium may also be added to any area of the casing, for example, a removable plate that already typically covers equipment connections.

Next, manufacturing may continue (element 708) by evaluating whether the selected medium is a CD, DVD, or other medium that may use an aperture. If the selected medium is not one of those media, then flow proceeds to element 712. If the selected medium is one of the above media, then an aperture may be planned for the medium to be able to spin (element 710). One embodiment provides for an aperture by opting to punch a hole in the second surface during manufacture and fit the second surface onto the first surface, for example, sheet (402) fitting onto sheet (404) in FIGS. 4A-B. Another embodiment provides for an aperture by opting to manufacture double-door subdivisions (502, 504) in FIGS. 5A-B to fold open for the CD to spin.

With element 712 of FIG. 7, manufacturing continues by evaluating whether the selected medium may benefit from some protection from damage. If not, then flow proceeds to element 716. In some embodiments, if the selected medium may benefit from some protection from damage, then damage protection, such as attaching a metalized insert, rubberizing screws, relocating the removable plate away from heat or magnetic flux, or the like, may be employed (element 714).

With element 716, manufacturing continues by evaluating whether the second surface is to be accessed at this time. In some embodiments, if the second surface needs to be accessed, then the removable plate is released in element 718. Releasing the removable plate may occur in some embodiments by a user manually ejecting the removable plate from a casing. In other embodiments, releasing a removable plate is automated and occurs according to instructions of a processor internal to the processor-based device or internal to a data-reading device with a processor coupled with the processor-based device. When a data-reading device is coupled to the processor-based device, some embodiments include the medium to be designed to store instructions for the media-reading device to execute to facilitate recovery from a software failure.

After the removable plate is released, media on the removable plate is accessed (element 720). Accessing the media on the removable plate may take place for several reasons. In one embodiment, removable plate media is accessed for software installation. In other embodiments, removable plate media is accessed in order to recover a computer system. Thus, in the event of a system failure, the removable plate piece of casing may involve system reboot information handy to the processor-based device or another device coupled to it. In several embodiments, removable plate media may be accessed for storage of additional data on the removable plate media. In yet other embodiments, removable plate media is accessed to update data already stored on the medium. Some examples of data to update might be recovery and backup information for the system (100) of FIG. 1.

Finally, an embodiment includes element 722, during which software prompts a user to replace the removable plate. A user is requested to replace the removable plate because the removable plate may function to cover and protect sensitive connections located in openings in the casing.

Figure 8:
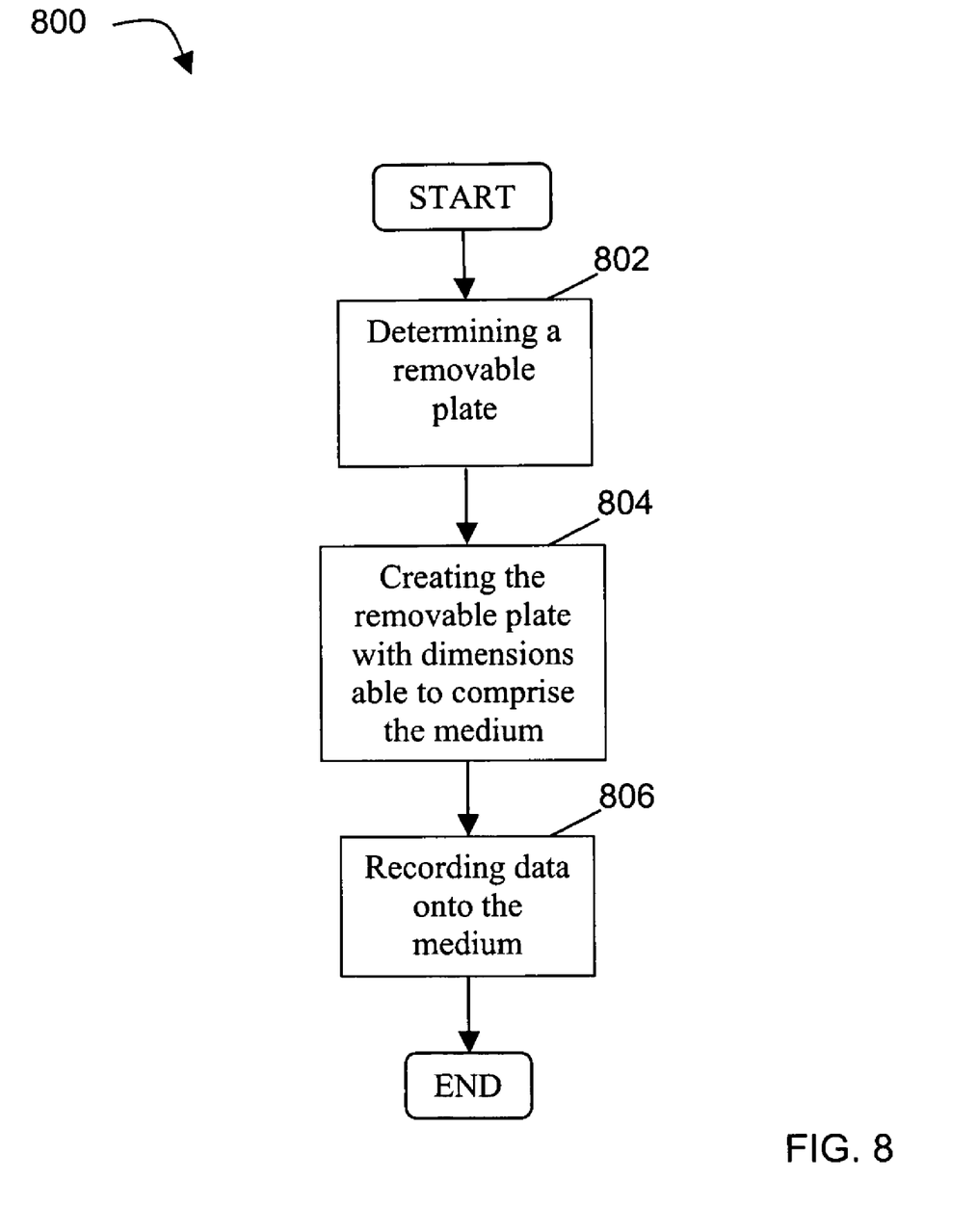
FIG. 8 depicts an example of a flowchart for a method to provide a medium for storage integral to a casing for processor-based device.

Referring now to FIG. 8, there is shown an example of a flowchart for a method to provide a medium for storage integral to a casing for a processor-based device. Flow chart 800 begins with element 802, determining a removable plate. The removable plate is able to be integral to a casing and may function to cover an opening in the casing, where the dimensions of the removable plate are able to include a medium. In one embodiment, determining a removable plate includes designing the removable plate from scratch. In other embodiments, determining a removable plate includes identifying a removable plate that has already been manufactured to which a medium may be added, for example, punching a hole in a current battery case cover of a portable computer.

After the removable plate is determined, the removable plate having the medium is created (element 804). In some embodiments, the medium may be added based upon the dimensions of the removable plate. In one embodiment, creating a removable plate may include installing DVD medium capabilities onto the above battery case cover of a portable computer.

After the removable plate is created, the medium may be accessed (element 806). In some embodiments, accessing the medium may include using the media to install software, reboot and recover a computer system in the event of a system failure. In other embodiments, accessing the medium may also include storing data to the medium or updating data on the medium. Data, such as recovery software or software installation from a factory, may be recorded onto the medium as the removable plate is being created and before it is installed into a processor-based device. In another embodiment, medium access and data storage occurs after the removable plate is first installed into a processor-based device.

Figure 9:
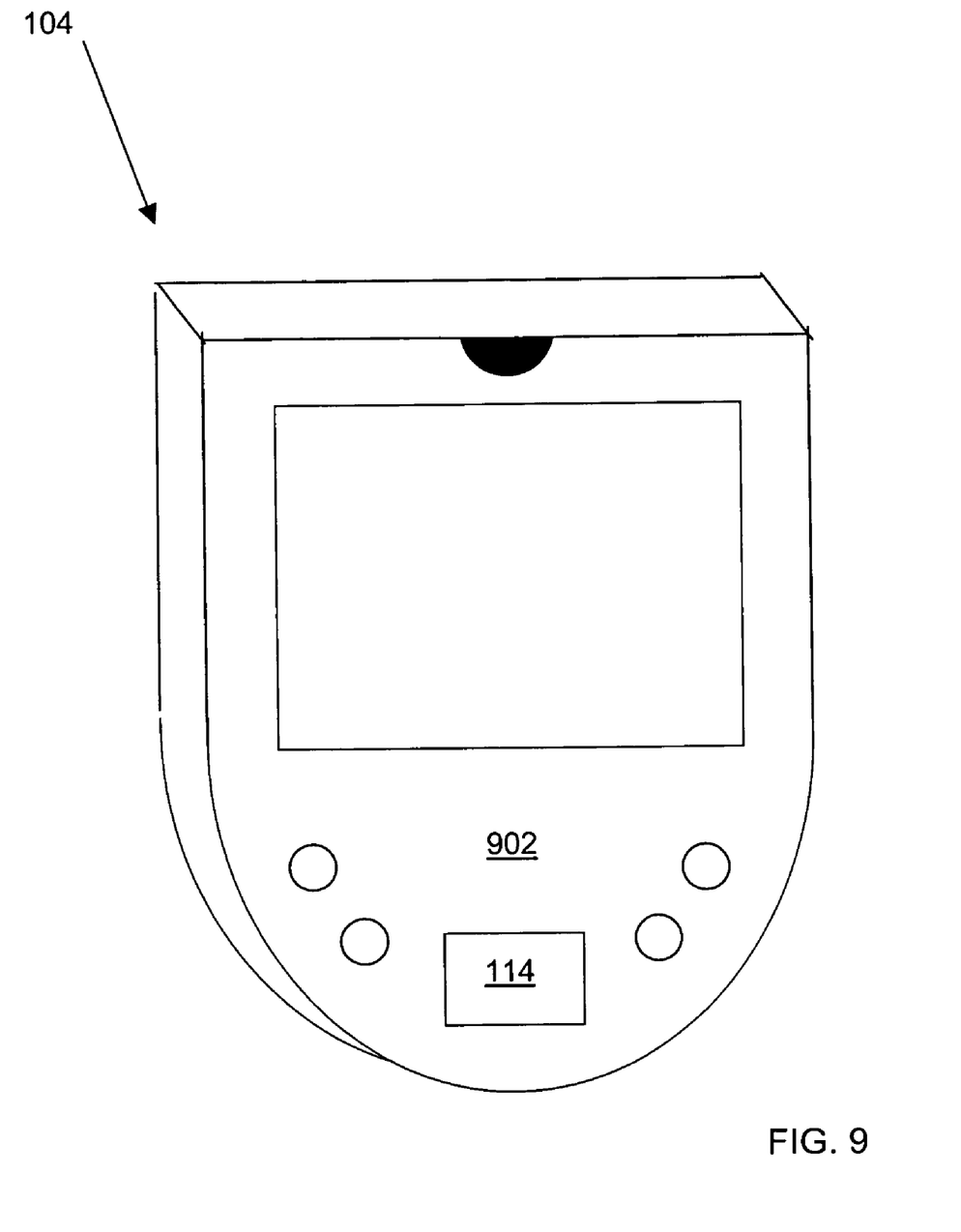
FIGS. 9-11 depict embodiments of processor-based devices such as a router, a printer, and a personal digital assistant (PDA), including a casing and a removable plate to store data as part of a hardware casing.

Turning the discussion now to FIG. 9, FIG. 9 depicts an embodiment of a PDA as a processor-based device (104) including a casing (902) and a removable plate (114) to store data as part of a piece of hardware casing. PDA (104) is another example of a processor-based device. Casing (902) substantially encases PDA (104) which includes an opening. The opening is covered by removable plate (114) which has a medium and a surface designed to provide access to that medium. Another removable plate (not shown) of PDA that is already pervasive in the computer world is the battery case cover located on the back of the PDA in this embodiment, though the battery case may functionally be located elsewhere on the PDA within the limits of this invention. The battery case cover is an example of a currently manufactured removable cover that may take in media to store data for corresponding data, backup files, installation software, recovery files, or the like. An example that may be convenient for a PDA would be a removable plate that functions as a battery case cover and stores flash memory. Then, for example, the flash memory may migrate from PDA to PDA as the user replaces his product.

Figure 10:
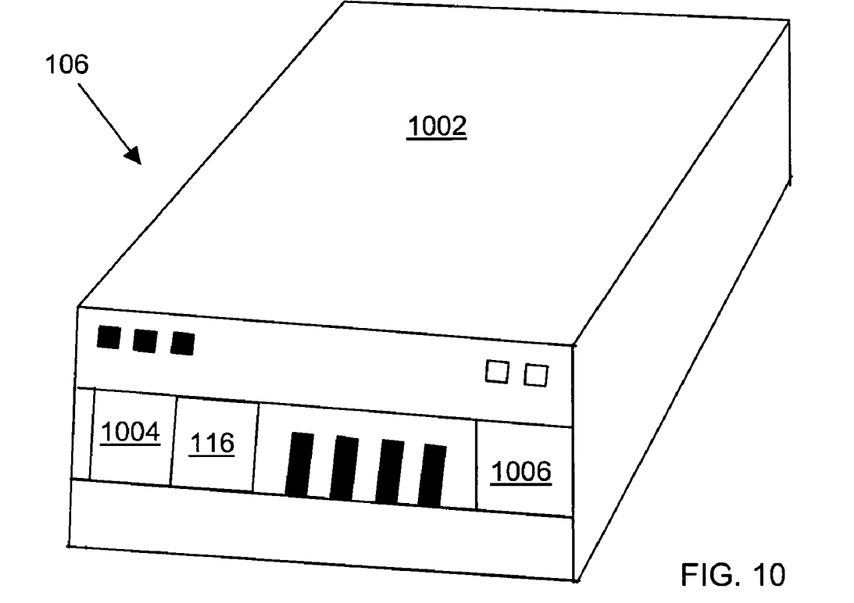

FIG. 10 depicts an embodiment of a router (106) as a processor-based device to store data as part of a piece of hardware casing. The router (106), such as an IBM 2210 Nways Multiprotocol Computer, Cisco 10720 Internet Computer, Cisco 12016 Internet Computer, or the like, is a device that determines the next network point to which a packet should be forwarded toward its destination. The router (106) may create or maintain a table of the available routes and their conditions and use this information along with distance and cost algorithms to determine the best route for a given packet. As a device, the router (106) includes a hardware casing (1002). In several embodiments, the casing (1002) substantially encases the router (106). Casing (1002) comprising three openings. In one embodiment, the openings may originate from a portion of the casing (1002) already left open to allow access of equipment connections. For example, router (106) generally includes openings for such connections as a serial port, WAN Interface Card (WIC) T1, 10/100 Ethernet Port, and other equipment connections. To protect and cover equipment connections of router (106), router (106) includes one or more removable plates (1004, 116, and 1006). In this embodiment, the removable plate (1004) covers an opening over a serial port, the removable plate (116) covers both an opening over a WAN interface card (WIC) T1 and an opening over a 10/100 Ethernet port, and the removable plate (1006) covers an opening over an on/off switch.

Figure 11:
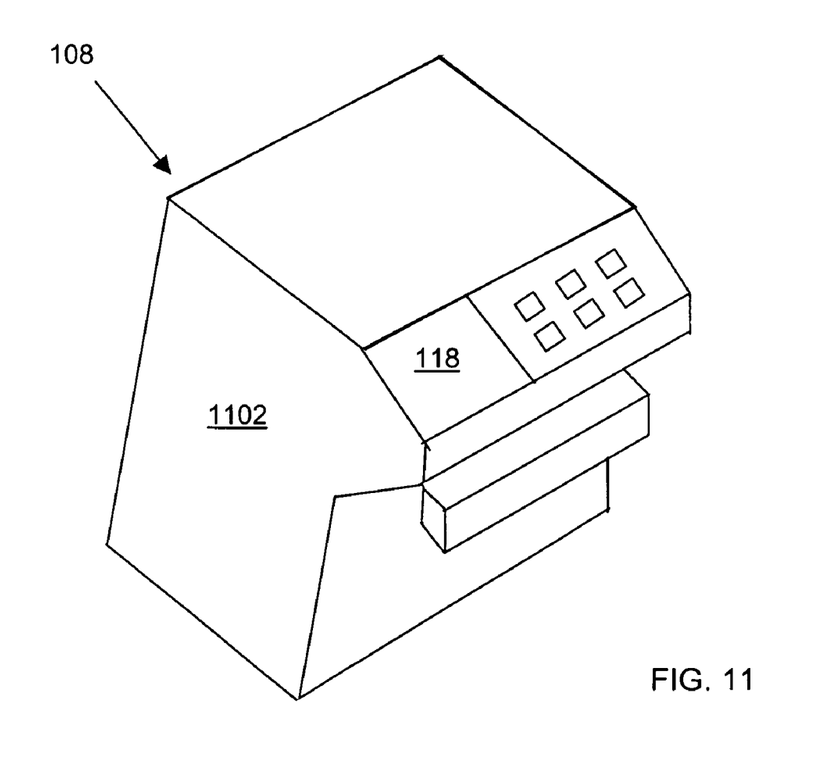

FIG. 11 depicts an embodiment of a printer (108) as a processor-based device including a casing (1102) and a removable plate (118) to store data as part of a hardware casing. An embodiment of the printer (108), such as an IBM Infoprint 1312, IBM 4247 Multiform Printer, IBM Infoprint® Color 130 Plus, or the like, includes a casing (1102) to substantially encase the printer (108). The casing (1102) is made up of at least one smaller section of its surface area, this smaller section defining a removable plate (118) anywhere on the periphery or sidewall. The removable plates (118) may facilitate recovering from a software failure, accessing supplementary data, or installing software. In one embodiment, removable plate (118) is a collection of additional fonts and postscript software. A printer operator may install less data and software onto internal memory of printer (108) and thus, improve speed and memory efficiency. When the operator prefers to load additional fonts or postscript software, a disk located in the removable plate (118) is handy and convenient to the printer (108). The operator would then plug removable plate (118) into a card slot on printer (108). In another embodiment, the operator would then connect the printer (108) to another processor-based device, such as the computer (102) of FIG. 1, and plug the removable plate (118) into a card slot located on the computer (102).

As a person of ordinary skill in the art would observe, many more figures could follow to illustrate further embodiments of processor-based devices that may benefit from this invention by having removable plates with media built into their casings. Some examples may include a desktop computer, scanner, fax, car dash, microwave, and any other piece of hardware that may include a processor or couple to a piece of hardware that includes a computer processor.

One embodiment of the invention is implemented as a program product for use with a processor-based device such as, for example, as shown in FIG. 1, the printer (108), the computer (106), the PDA (104), or the portable computer (102), or the like. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, indicate embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and arrangements for hardware casing media to store data. It is understood that the form of the invention shown and described in the detailed description and the drawings are to be taken merely as examples. It is intended that the following claims be interpreted broadly to embrace all the variations of the example embodiments disclosed.

What is claimed is:

1. A method to couple a medium to a casing for a processor-based device, the method comprising:

determining a first surface of a removable plate wherein the first surface is complementary to the casing and is manufactured to cover a portion of the processor-based device, wherein a second surface of the removable plate is configured to provide access to the medium, the medium being capable of storing data, wherein the second surface is designed to face the processor-based device on the inner side of the casing;

adapting the removable plate to couple with the casing;

releasing the removable plate and accessing the medium on the removable plate; and prompting a user to replace the removable plate when the removable plate is separate from the processor-based device.

2. A method to couple a medium to a casing for a processor-based device, the method comprising:

determining a first surface of a removable plate wherein the first surface is complementary to the casing and is manufactured to cover a portion of the processor-based device, wherein a second surface of the removable plate is configured to provide access to the medium, the medium being capable of storing data, wherein the second surface is designed to face the processor-based device on the inner side of the casing;

adapting the removable plate to couple with the casing; and determining a first surface of a removable plate comprises painting a coating onto an existing medium.

\* \* \* \* \*